United States Patent
Poulakis

(10) Patent No.: US 11,659,899 B2
(45) Date of Patent: May 30, 2023

(54) TOUCH FASTENER PART

(71) Applicant: Gottlieb Binder GmbH & Co. KG, Holzgerlingen (DE)

(72) Inventor: Konstantinos Poulakis, Hildrizhausen (DE)

(73) Assignee: GOTTLIEB BINDER GMBH & CO. KG, Holzgerlingen (DE)

( * ) Notice: Subject to any disclaimer, the term of this patent is extended or adjusted under 35 U.S.C. 154(b) by 116 days.

(21) Appl. No.: 16/975,449

(22) PCT Filed: Mar. 14, 2019

(86) PCT No.: PCT/EP2019/056498
§ 371 (c)(1),
(2) Date: Aug. 25, 2020

(87) PCT Pub. No.: WO2019/179883
PCT Pub. Date: Sep. 26, 2019

(65) Prior Publication Data
US 2021/0015218 A1    Jan. 21, 2021

(30) Foreign Application Priority Data

Mar. 17, 2018 (DE) ............... 10 2018 002 180.8

(51) Int. Cl.
*A44B 18/00* (2006.01)
*B60N 2/64* (2006.01)
(52) U.S. Cl.
CPC .............. *A44B 18/008* (2013.01); *B60N 2/64* (2013.01)
(58) Field of Classification Search
CPC .... A44B 18/008; A44B 18/0076; B60N 2/64; Y10T 428/24017
See application file for complete search history.

(56) References Cited

U.S. PATENT DOCUMENTS 3,717,908 A    2/1973 Perina
4,726,975 A *  2/1988 Hatch ................. B29C 37/0082
                                                           428/317.1
(Continued)

FOREIGN PATENT DOCUMENTS

DE   10 2004 015 321    10/2005
DE   10 2010 029 377     7/2011
(Continued)

OTHER PUBLICATIONS

International Search Report (ISR) dated May 24, 2019 in corresponding International (PCT) Application No. PCT/EP2019/056498.

*Primary Examiner* — Robert Sandy
*Assistant Examiner* — Louis A Mercado
(74) *Attorney, Agent, or Firm* — Wenderoth, Lind & Ponack, L.L.P.

(57) ABSTRACT

A touch fastener part has a first substrate tape (10) with hooking elements (12) arranged on one side and has a second substrate tape (16) connected to the first substrate tape (10). The second substrate tape (10) has a connectors (20) on its side facing away from the hooking elements (12) and is wider than the first substrate tape (10). At least one free lateral edge area (22) of the second substrate tape (16) projects beyond the adjacent longitudinal edge of the first substrate tape (10). The two substrate tapes (10, 16) can be bent along and transversely to their longitudinal orientation by at least one free side edge area (22) of the second substrate tape (16) being provided with a weakening of resistance (27) in such a way that bending the two substrate tapes (10, 16) transversely to their longitudinal orientation is facilitated.

20 Claims, 3 Drawing Sheets

(56) References Cited

U.S. PATENT DOCUMENTS

| | | | | |
|---|---|---|---|---|
| 4,784,890 A | * | 11/1988 | Black | B60N 2/5891 |
| | | | | 24/444 |
| 5,180,618 A | * | 1/1993 | Kessler | A44B 18/0076 |
| | | | | 24/444 |
| 5,422,156 A | * | 6/1995 | Billarant | A44B 18/0076 |
| | | | | 428/354 |
| 7,559,124 B2 | * | 7/2009 | Poulakis | A44B 18/0076 |
| | | | | 24/442 |
| 7,971,325 B2 | * | 7/2011 | Line | A44B 18/0076 |
| | | | | 24/442 |
| 8,322,002 B2 | * | 12/2012 | Cheng | B60N 2/6036 |
| | | | | 24/444 |
| 8,745,827 B2 | * | 6/2014 | Rocha | B29C 37/0085 |
| | | | | 24/442 |
| 9,357,815 B2 | * | 6/2016 | Minato | A44B 18/0076 |
| 9,433,262 B2 | * | 9/2016 | Okuda | A44B 18/0015 |
| 9,504,296 B2 | * | 11/2016 | Cina | A44B 18/0076 |
| 10,189,387 B2 | * | 1/2019 | Ren | B60N 2/72 |
| 2002/0031637 A1 | * | 3/2002 | Oborny | B32B 3/06 |
| | | | | 428/192 |
| 2008/0222856 A1 | | 9/2008 | Poulakis | |
| 2011/0030176 A1 | | 2/2011 | Itoh et al. | |
| 2013/0340214 A1 | | 12/2013 | Terada et al. | |
| 2014/0130311 A1 | | 5/2014 | Okuda et al. | |

FOREIGN PATENT DOCUMENTS

| | | |
|---|---|---|
| EP | 2 269 480 | 1/2011 |
| EP | 2 684 480 | 1/2014 |
| EP | 2 941 978 | 11/2015 |
| FR | 2 566 316 | 12/1985 |

* cited by examiner

TOUCH FASTENER PART

FIELD OF THE INVENTION

The invention relates to a touch fastener part having a first substrate tape having hooking elements arranged on one side thereof and having a second substrate tape. The second substrate tape is connected to the first substrate tape and has a connection means or connectors on its side facing away from the hooking elements. The second substrate tape is wider than the first substrate tape. At least one free lateral edge area of the second substrate tape projects beyond the adjacent longitudinal edge of the first substrate tape. The two substrate tapes can be bent along and transversely to their longitudinal orientation.

BACKGROUND OF THE INVENTION

Touch fastener parts have proved their value in many areas as a detachable and functionally reliable joining and fastening technology. For applications for aircraft or vehicle seats, they are used, among other things, to fasten seat covers to foam body parts of a molded foam. The respective touch fastener parts are foamed into the upholstery foam material during the manufacture of the respective seat. The respective other touch fastener parts having the corresponding hooking elements are fixed, in particular sewn, to the upholstery cover material. During the production of the foam body parts, the touch fastener parts are inserted into seating pipes of a foaming mold. By placing foam material in the free cross-sections of the foaming mold, preferably by inserting polyurethane (PU) foam, the touch fastener parts are attached to the foam body parts during the foaming process. DE 10 2004 015 321 A1 discloses a touch fastener part of the genus mentioned above to be attached to foam body parts by a foaming process.

In the case of the known touch fastener part, both the substrate tape of the hooking elements and the second substrate tape are formed from an injection-molded plastic section. The flat composite, formed by the tapes, has a relatively high resistance to bending, mainly in the plane of the tape. Because of the shape of the foam body parts, curved seam courses occur. Along the seam courses, touch fastener parts are to be foamed. One is then forced to provide several touch fastener parts of shorter length in bending areas, instead of one continuous, long touch fastener part. This requirement results at least in a disadvantageous increase in the amount of work required to attach the touch fastener parts during the foaming process.

SUMMARY OF THE INVENTION

With regard to this problem, the invention addresses the object of providing a touch fastener part of the genus mentioned at the beginning, which permits being attached to the concerning foam body part during the foaming process, even in a curved shape.

According to the invention, this object is basically solved by a touch fastener part having, as an essential feature of the invention, at least one free side edge area of the second substrate tape provided with a weakening of resistance in such a way that bending the two substrate tapes transversely to their longitudinal orientation is facilitated. The reduction in the bending stiffness of the touch fastener parts according to the invention and achieved in this way permits the use of longitudinal touch fastener parts following the course of the seam, despite the connecting areas between the upholstery cover material and the foam body part concerned not extending along a straight line.

The weakening of resistance is advantageously arranged at least at the one lateral edge area of the second substrate tape in the direction of the lateral edge area the two substrate tapes are bent.

The arrangement can advantageously be such that one side edge area each of the second substrate tape protrudes beyond both longitudinal edges of the first substrate tape and that both side edge areas have the same surface area and are each provided with an equally effective weakening of resistance.

A particularly favorable bending behavior can be achieved if the respective weakening of resistance of a side edge area of the second substrate tape continuously merges into the first substrate tape.

The arrangement can be particularly advantageous such that the respective weakening of resistance of the first and second substrate tape ends at a bending line that defines the longitudinal axis of at least the first substrate tape.

The arrangement can be particularly advantageous such that the respective weakening of resistance of the first and second substrate tapes subdivides the hooking elements of the first substrate tape into adhesive segments aligned one behind the other along the respective bending line.

It is indispensable for the functionality of the touch fastener parts that the hooking elements are protected against entry of foam material during the foaming process. In advantageous embodiments, the two substrate tapes are provided with a preferably self-adhesive cover sheeting on the sides of the hooking elements to prevent the hooking elements from sticking due to entering foam material, and thus, becoming inoperative. After the removal of the cover sheeting, the hooking elements are exposed for hooking engagement.

A particularly reliable protection of the hooking elements against entry of foam material can be achieved if a foam barrier is inserted between the cover sheeting and the hooking elements of the first substrate tape. The foam barrier at least partially engages with the spaces between the hooking elements. A carpet pile, wherein the carrier of the carpet pile is in contact with the cover sheeting and the pile threads of the carpet pile form an envelope for the hooking elements, may form such a foam barrier acting in addition to the cover sheeting.

The respective weakening of resistance may be formed by at least one reduction of wall thickness and/or perforation and/or recess and/or change in strength of at least one side edge area of the second substrate tape.

In the case of particularly advantageous embodiments, a sequence of recesses is formed, starting from at least one longitudinal edge of the second substrate tape. The recesses extend transversely to the longitudinal direction of the tape in both substrate tapes up to close to the centerline of the tape or the bending line.

A particular increase in flexibility is achieved if a sequence of recesses is formed each starting from both longitudinal edges of the second substrate tape.

In particularly advantageous embodiments, the recesses are formed equally and have V-shapes tapering inwards from the respective longitudinal edges.

The arrangement can be made with particular advantage such that the boundary edges of the respective V-shaped recesses form an angle of 20° to 30°, preferably 25°, between each other.

The arrangement can be made with particular advantage such that the recesses are equidistantly spaced to each other at distances that are preferably smaller than the width of the second substrate tape.

A particularly favorable bending behavior can be achieved if the recesses of the one sequence are aligned with the recesses of the other sequence.

In particularly advantageous embodiments, the arrangement is such that the recesses end in front of the centerline of the substrate tapes at a distance, which is less than 1/8, preferably less than 1/10, of the width of the second substrate tape.

With particular advantage, the recesses can be formed from incisions or punchings in the assignable tape material. The incisions or punchings extend completely through the material.

The arrangement can be made with advantage such that the V-shaped recesses tapering in the direction of the bending line are closing on one side increasingly in the event of bending until the wall parts of the two substrate tapes, delimiting the V-shaped recesses, come into contact with one another. In the event of bending in one direction, the assignable V-shaped recesses on one side are closing. The respective recesses on the opposite side of the two substrate tapes spread apart correspondingly.

The subject matter of the invention is also the use of a touch fastener part in a foaming mold, in particular for manufacturing of vehicle seat cushions, having a seating pipe into which the touch fastener parts can be inserted covered by the cover sheeting. After connecting the molded foam to the connection means while forming at least a part of the seat cushion and after removal from the foaming mold after the cover sheeting has been taken off, the hooking elements are exposed.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
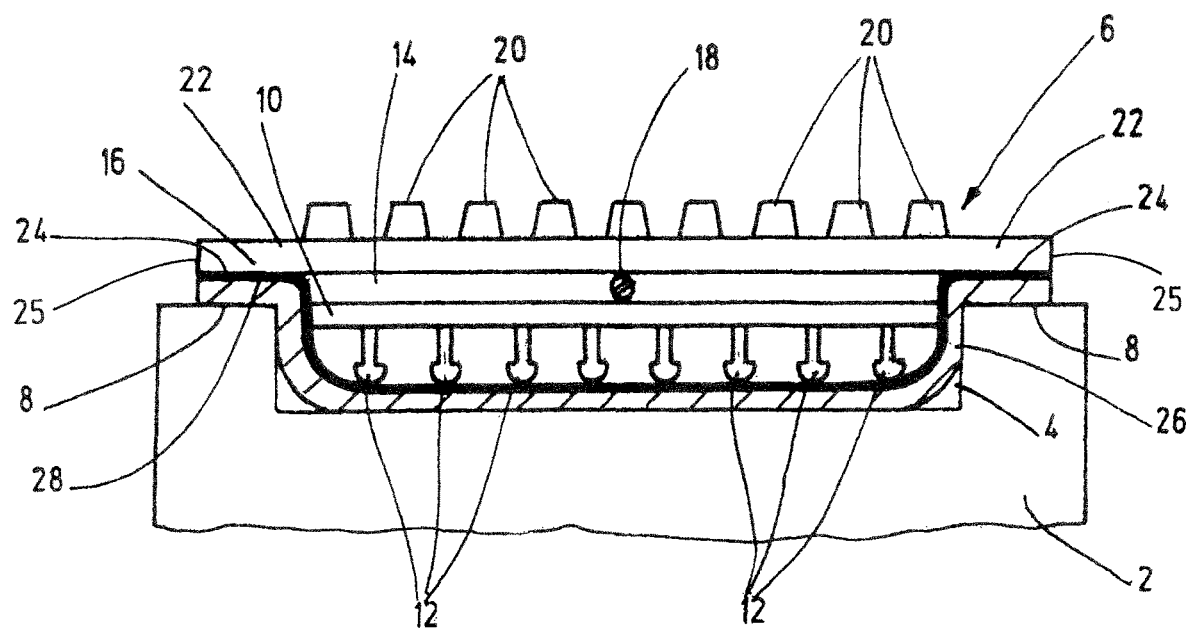
FIG. 1 is schematically simplified and not to scale, side view in section of a section of a seating pipe for a foaming mold, wherein a touch fastener part is inserted in the mold cavity of the seating pipe according to an exemplary embodiment of the invention.

In FIG. 1, a seating pipe 2, which is part of a foaming mold that is not shown apart from the sealing pipe 2. The seating pipe 2 has a mold cavity 4 in the form of a recess, the free cross-section of that recess is adapted to the touch fastener part 6 to be received therein. Along the lateral longitudinal edges, the mold cavity 4 is delimited by flat wall sections 8. The touch fastener part 6 has a flat substrate tape 10. On one side of the substrate tape 10 hooking elements are arranged. In the example shown, these are formed by mushroom heads 12 (only some of the mushroom heads are numbered in the drawing). The mushroom heads 12 are located on stems projecting from the substrate tape 10. This structure is a touch fastener element, in which 200 to 400 or more hooking elements per $cm^2$ are provided on a substrate tape 10. It can be formed by a polyamide base fabric having polypropylene stems. On the stems, the mushroom heads 12 are formed by thermal processing. The substrate 10 having the mushroom heads 12 can also be an injection-molded plastic section. While in the example shown, the hooking elements are formed by mushroom heads 12, the hooking elements can also be formed by slings or loops of a loop material. Touch fastener elements of this type, having mushroom heads 12 as hooking elements, are commercially available by the applicant under the product name Pressotex® and having hooking elements in the form of a fleece material under the product name Klettostar®.

On its side facing away from the hooking elements, the substrate tape 10 is firmly connected to a second substrate tape 16 via an adhesive layer 14. In this example, the adhesive layer 14 is a moisture cross-linking adhesive containing polyurethane. An iron wire 18 is embedded in the center of the adhesive layer 14 and extends over the entire length of the touch fastener part 6, perpendicular to the drawing plane. In conjunction with permanent magnetic elements (not shown) in the foaming mold, the iron wire 18 forms a magnetic holding device fixing the touch fastener part 6 in the seating pipe 2. The second substrate tape 16, attached via the adhesive layer 14, is an injection-molded plastic section having round protrusions 20 in the form of free-standing rods formed on the side facing away from the adhesive layer 14. These protrusions form a connecting structure that ensures for good adhesion of the molded foam during the foaming process. As can be seen in the drawing, the second substrate tape 16 has a greater width than the first substrate tape 10 and a side edge area 22 on each side, having the same width, of the second substrate tape 16 protruding laterally beyond the first substrate tape 10. With the side facing away from the projections 20, these edge areas 22 each form a connecting zone 24, to which a cover sheeting 26 can be attached in a detachable manner. In this example, the cover sheeting 26 is formed by a sheeting, for instance made of polyester, which is provided in the manner of an adhesive tape with a pressure-sensitive adhesive 28. The longitudinal edges of the cover sheeting are detachably glued by the adhesive 28 to the connecting zones 24 of the side edge areas 22 of the second substrate tape 16. FIG. 1 shows this state in which, in preparation for a foaming process, the touch fastener part 6 together with the cover sheeting 26 are inserted in the seating pipe 2. The cover sheeting tightly encloses the entire area of the hooking elements (mushroom heads 12) and protects them against the entry of molding foam during the foaming process. After removing the cover sheeting 26, the mushroom heads 12 are available in fully functional state for the subsequent establishment of the adhesive connection with the respective corresponding further touch fastener part.

Figure 2:
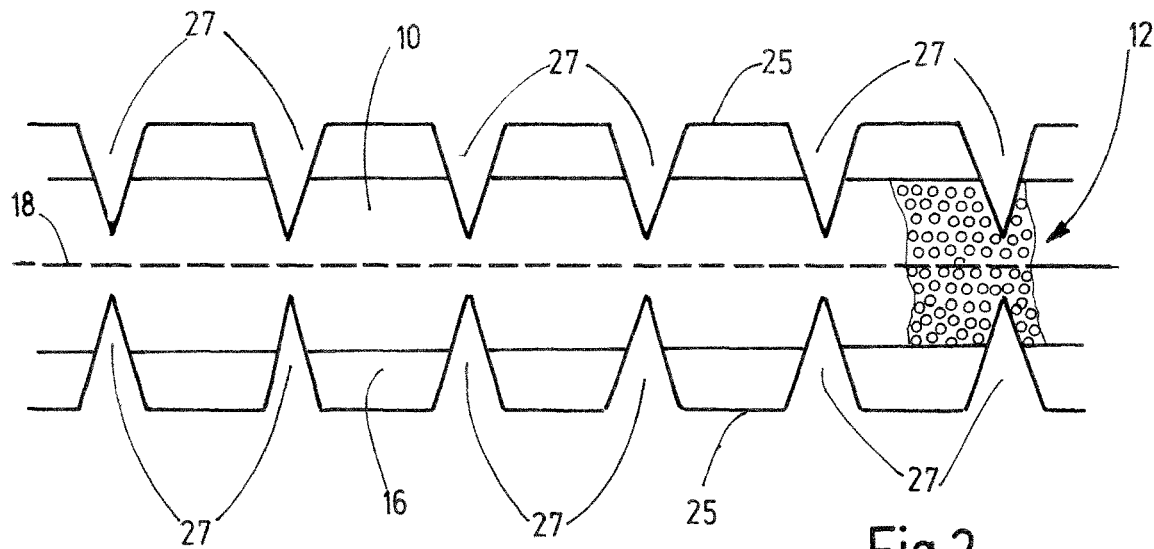
FIG. 2 is a correspondingly simplified and enlarged by a factor of approx. 2.5 compared to a practical embodiment top plan view of a length segment of the embodiment of FIG. 1, viewed towards the tape side having the hooking elements and without any overlying cover sheeting.

FIG. 2 shows a top view of a length segment of the embodiment of the touch fastener part 6 of FIG. 1 after the detachable cover sheeting 26 has been removed. As shown, starting from the longitudinal edges 25 of the second substrate tape 16, recesses 27 are formed. Recesses 27 extend in both tapes 16 and 10 in a direction perpendicular to the longitudinal direction of the tape up to close to the centerline of the tapes. More precisely, the recesses 27 each end equidistantly from the embedded iron wire 18 extending in the centerline of the tapes. In the example shown, the distance between the inner ends of the recesses 27 and the centerline of the tape is smaller than ⅒ of the width of the second substrate tape 16. The identically formed recesses 27 of both lateral sequences are equally formed and are arranged in alignment with each other, with each having a V-shape. The width of each V-shape decreases from the outer longitudinal edge (25 in FIG. 1) inwards and ends in a tip. The spacing between the equidistantly arranged recesses 27 is equal to the width of the second substrate tape 16 or preferably slightly less than that.

As mentioned above, mainly due to the material properties of the second substrate tape 16 formed by a plastic section, the touch fastener part 6 has a relatively high stiffness against bending in the tape plane, i.e. in the plane of FIG. 2. The recesses 27 result in a considerable reduction of this stiffness and provide sufficient flexibility to allow the touch fastener part 6 to be arranged in a course deviating from the straight line.

Figure 3:
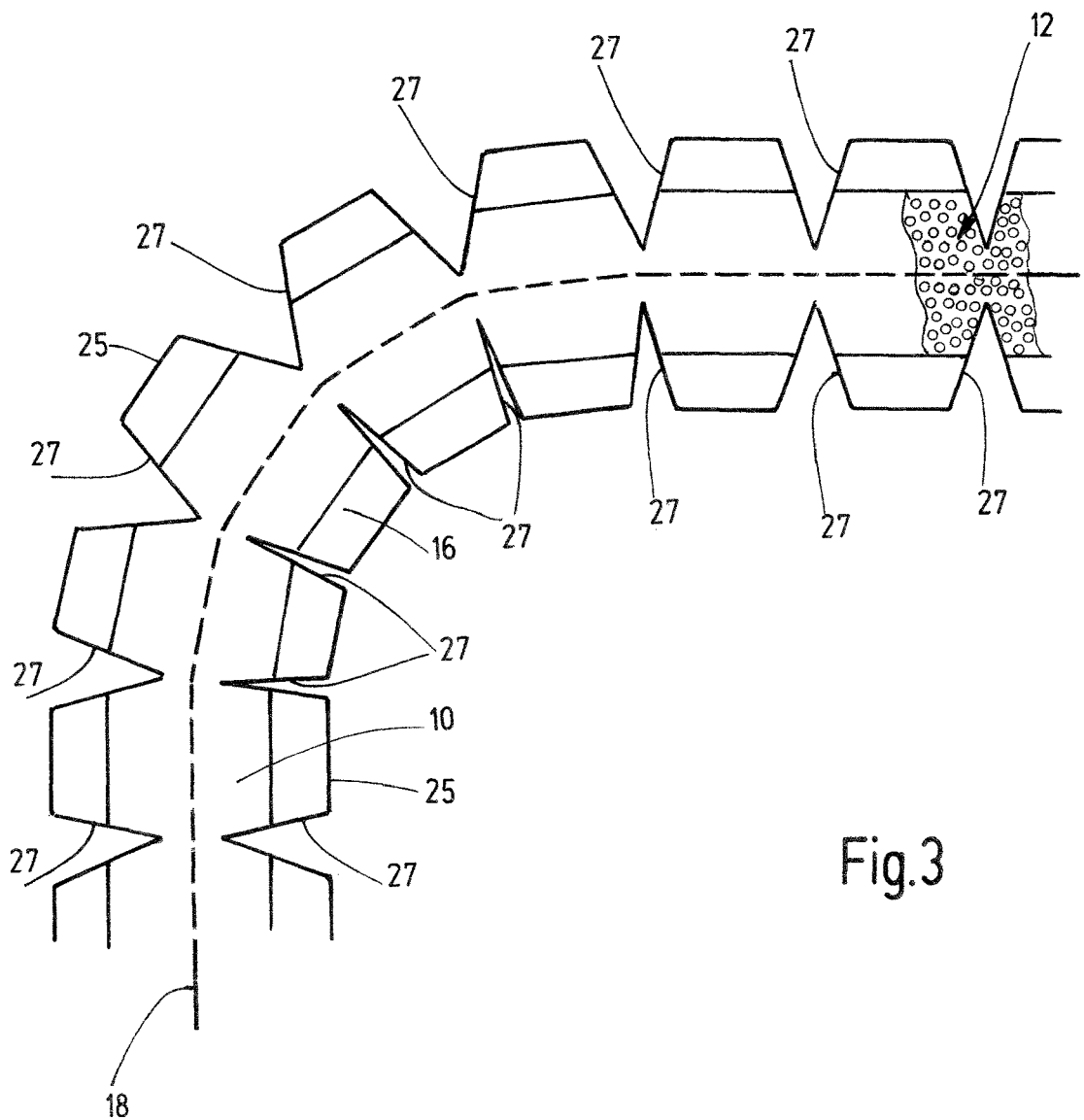
FIG. 3 is a top plan view corresponding to FIG. 2, wherein a bent state is shown.

In this respect, FIG. 3 shows the example of a length segment having a curved course. The longitudinal direction of the tape is angled by approximately 90°. Due to the fact that the recesses 27, because of the V-shape, form material cutouts having a larger width at the longitudinal edges, there are free spaces available on the inside at bends, as shown in FIG. 3. These free spaces allow the walls of the recesses 27 to approach each other while tapering the V-shape. The V-shape spreads apart on the outside of the bend. As a result, tighter bends, such as those shown in FIG. 3, can be achieved without bulging.

Figure 4:
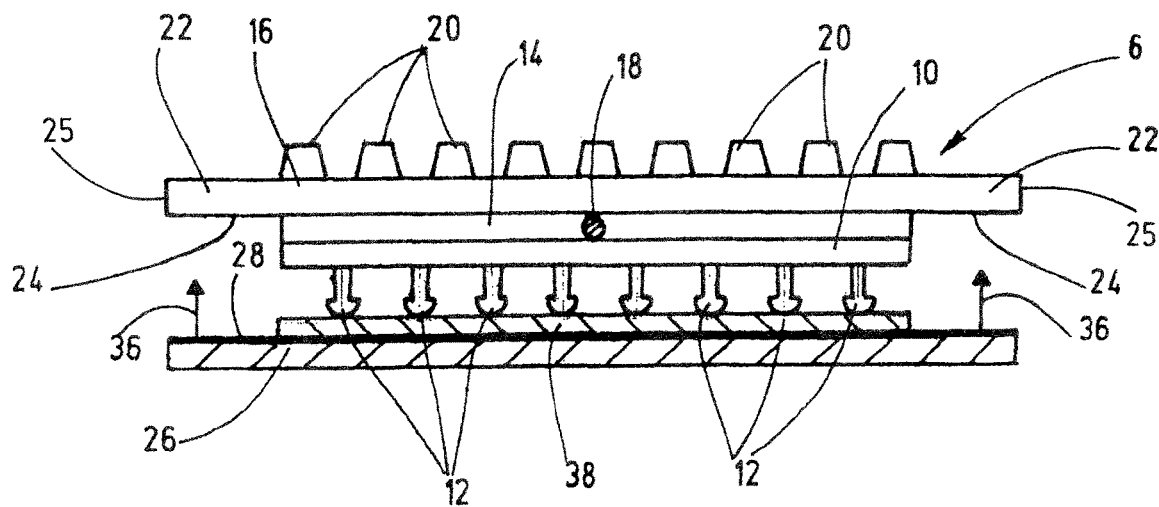
FIG. 4 is a simplified and not to scale, side view in section of a touch fastener part according to a second exemplary embodiment of the invention, wherein the state before attaching a cover sheeting is shown.

FIG. 4 shows a second embodiment, wherein, unlike in FIG. 1, the touch fastener part is shown in a partially finished state. The embodiment of FIG. 4 corresponds to the embodiment of FIGS. 1 to 3, apart from the fact that the pressure-sensitive adhesive 28 of the cover sheeting 26 is not in direct contact with the mushroom heads 12. A protective layer 38 is applied to the adhesive 28. The protective layer 38 is formed by a sheeting, for example of polyester, wherein the width of the sheeting corresponds to the width of the first substrate tape 10. In the partially finished state of FIG. 4, the protective layer 38 of the cover sheeting 26 is in contact with the mushroom heads 12, but not yet glued to the connecting zones 24 of the edge areas 22 of the second substrate tape 16 by moving the side edges of the cover sheeting 26 as indicated by arrows 36. The protective layer 38 extending over the entire width of the first substrate tape 10 protects the mushroom heads 12 from an application of the pressure-sensitive adhesive 28 of the cover sheeting 26.

Figure 5:
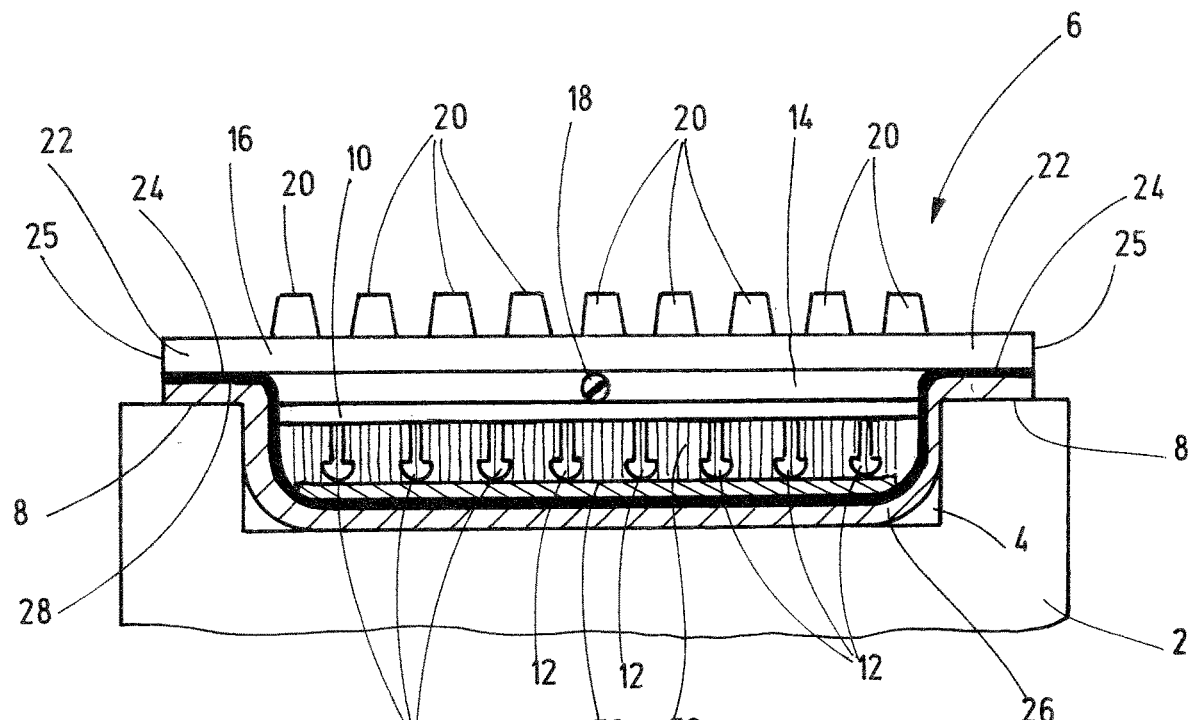
FIG. 5 is a schematically simplified and not to scale, side view in section of a section of a seating pipe for a foaming mold, wherein a touch fastener part is inserted in the mold cavity of the pipe according to a third exemplary embodiment of the invention.
Figure 6:
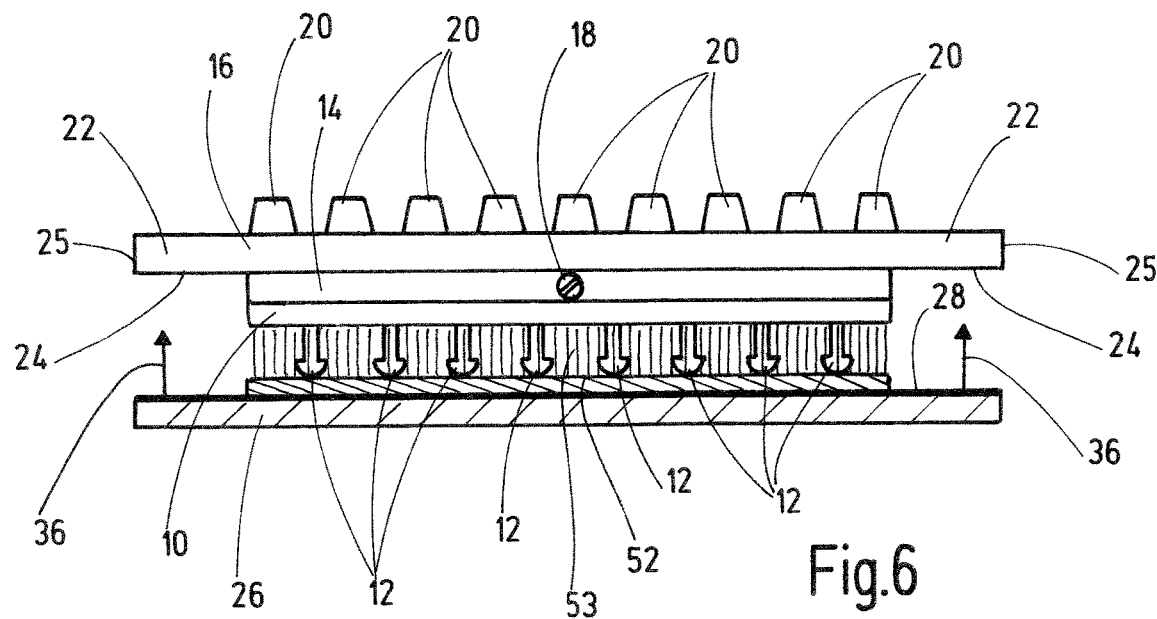
FIG. 6 is a side view in section of the third embodiment of the touch fastener part, wherein the state before the cover sheeting is attached is shown.

FIGS. 5 and 6 illustrate a third embodiment in which, in contrast to the embodiments described above, an additional foam barrier is provided to protect the mushroom heads 12 from entering of molding foam during the foaming process. This foam barrier is formed by a carpet pile. The carrier 52 of the carpet pile, instead of the protective layer 38, rests on the pressure-sensitive adhesive 28 of the cover sheeting 26 and is glued to the cover sheeting 26. The pile threads 53 of the carpet pile form a wrapping of the mushroom heads 12 as an additional foam barrier. At the same time, the carrier 52 protects the mushroom heads 12 from contact with the pressure-sensitive adhesive 28. FIG. 6 shows, corresponding to FIG. 4, the partially finished state before the cover sheeting 26 is glued to the connecting zones 24 at the edge areas 22 of the second substrate tape 16.

While various embodiments have been chosen to illustrate the invention, it will be understood by those skilled in the art that various changes and modifications can be made therein without departing from the scope of the invention as defined in the claims.

The invention claimed is:

1. A touch fastener, comprising:
   a first substrate tape having hooking elements arranged continuously on a first side of the first substrate tape and having a second side opposite the first side;
   a first side of a second substrate tape being connected on the second side of the first substrate tape, the second substrate tape having a second side opposite the first side of the second substrate tape, the second substrate tape being wider than the first substrate tape;
   connectors on the second side of the second substrate tape;
   V-shaped recesses of equal size and configuration being formed in adjacent first free lateral edge areas of the first and second substrate tapes forming a weakening of resistance facilitating bending of the first and second substrate tapes transversely and laterally relative to a longitudinal axis of the first and second substrate tapes, the V-shaped recesses tapering from the first free lateral edge areas, the hooking elements being subdivided by the V-shaped recesses into touch fastener segments one behind another along the longitudinal axis and extending continuously past laterally inward extensions of the V-shaped recesses; and
   a removable cover sheeting extends over sides of the hooking elements remote from the first side of the first substrate tape.

2. The touch fastener according to claim 1 wherein the first lateral edge area of the second substrate tape protrudes lateral beyond an adjacent side edge of the first substrate tape.

3. The touch fastener according to claim 1 wherein each of the first and second substrate tapes have second free lateral edge areas opposite the first free lateral edge areas thereof, the second lateral edge areas having V-shaped recesses of equal size and configuration formed therein and tapering from the second free lateral edge areas.

4. The touch fastener according to claim 1 wherein the first free lateral edge areas and second free lateral edge areas of the second substrate tape protrude laterally beyond adjacent side edges of the first substrate tape.

5. The touch fastener according to claim 1 wherein the V-shaped recesses end at a predetermined distance from the longitudinal axis of the first and second substrate tapes.

6. The touch fastener according to claim 1 wherein the fastener segments are interconnected adjacent to one another at articulation points formed by the V-shaped recesses along the longitudinal axis, with the hook elements extending beyond the articulation points.

7. The touch fastener according to claim 1 wherein
a foam barrier is between the cover sheeting and the first substrate tape and at least partially engages spaces between the hooking elements.

8. The touch fastener according to claim 1 wherein
each of the V-shaped recesses extend from a longitudinal edge of the second substrate tape transversely to the longitudinal axis close to but spaced from the longitudinal axis.

9. The touch fastener according to claim 1 wherein
the V-shaped recesses extend from both longitudinal edges of the second substrate tape transversely to the longitudinal axis to close to but spaced from the longitudinal axis.

10. The touch fastener according to claim 1 wherein
boundary edges of each V-shaped recess form an angle at 20° to 30° between each other.

11. The touch fastener according to claim 10 wherein
the angle is 25°.

12. The touch fastener according to claim 1 wherein
the V-shaped recesses are equally spaced from one another by distances smaller than a width of the second substrate tape.

13. The touch fastener according to claim 1 wherein
the V-shaped recesses extend from both longitudinal edges of the second substrate tape, with the V-shaped recesses extending from one longitudinal edge of the second substrate tape being aligned with the V-shaped recesses extending from the other longitudinal edge of the second substrate tape.

14. The touch fastener according to claim 1 wherein
the V-shaped recesses have closed ends spaced by a distance less than one-eighth of a width of the second substrate tape.

15. The touch fastener according to claim 14 wherein
the distance is less than one-tenth of the width.

16. The touch fastener according to claim 1 wherein
the V-shaped recesses extend completely through materials of the first and second substrate tapes in a direction perpendicular to the first and second sides of the first and second substrate tapes.

17. The touch fastener according to claim 1 wherein
the V-shaped recesses extend from both longitudinal edges of the second substrate tape with the V-shaped recesses extending from one longitudinal edge of the second substrate tape closing and the V-shaped recesses extending from the other longitudinal edge of the second substrate tape spreading upon bending of the first and second substrate tapes.

18. A touch fastener, comprising:
a first substrate tape having hooking elements arranged on a first side of the first substrate tape and having a second side opposite the first side;
a first side of a second substrate tape being connected on the second side of the first substrate tape, the second substrate tape having a second side opposite the first side of the second substrate tape, the second substrate tape being wider than the first substrate tape with a first free lateral edge area of the second substrate tape projecting beyond an adjacent longitudinal edge of the first substrate tape;
connectors on the second side of the second substrate tape; and
a weakening of resistance in the first free lateral edge area of the second substrate tape facilitating bending of the first and second substrate tapes transversely and laterally relative to a longitudinal axis of the first and second substrate tapes, the first and second substrate tapes being divided into individual insular touch fastener segments interconnected adjacent to one another at points of the weakening of resistance along the longitudinal axis via articulation points such that the hooking elements and the connectors extend from one of the touch fastener segments to an adjacent one of the touch fastener segments beyond the respective articulation point.

19. A touch fastener, comprising:
a first substrate tape having hooking elements arranged on a first side of the first substrate tape and having a second side opposite the first side;
a first side of a second substrate tape being connected on the second side of the first substrate tape, the second substrate tape having a second side opposite the first side of the second substrate tape, the second substrate tape being wider than the first substrate tape with a first free lateral edge area of the second substrate tape projecting beyond an adjacent longitudinal edge of the first substrate tape;
connectors on the second side of the second substrate tape; and
a weakening of resistance in the first free lateral edge area of the second substrate tape facilitating bending of the first and second substrate tapes transversely and laterally relative to a longitudinal axis of the first and second substrate tapes;
a removable cover sheeting extending over sides of the hooking elements remote from the first side of the first substrate tape; and
a foam barrier between the cover sheeting and the hooking elements of the first substrate tape and at least partially engages spaces between the hooking elements.

20. A foaming mold for a seat cushion, the foaming mold comprising:
a seating pipe;
a touch fastener being inserted in the seating pipe and including
a first substrate tape having hooking elements arranged on a first side of the first substrate tape and having a second side opposite the first side,
a first side of a second substrate tape connected on the second side of the first substrate tape, the second substrate tape having a second side opposite the first side of the second substrate tape, the second substrate tape being wider than the first substrate tape with a first free lateral edge area of the second substrate tape projecting beyond an adjacent longitudinal edge of the first substrate tape,
connectors on the second side of the second substrate tape,
a weakening of resistance in the first free lateral edge area of the second substrate tape facilitating bending of the first and second substrate tapes transversely and laterally relative to a longitudinal axis of the first and second substrate tapes,
a removable cover sheeting covering the hooking elements, and
a foam barrier between the cover sheeting and the hooking elements of the first substrate tape and at least partially engages spaces between the hooking elements;
whereby after connecting molded foam to the connectors while forming at least a part of the seat cushion and then removing the part of the seat cushion from the seating pipe and the cover sheeting from the hooking elements, the hooking elements are exposed on the part of the seat cushion.

* * * * *